Figure 1:
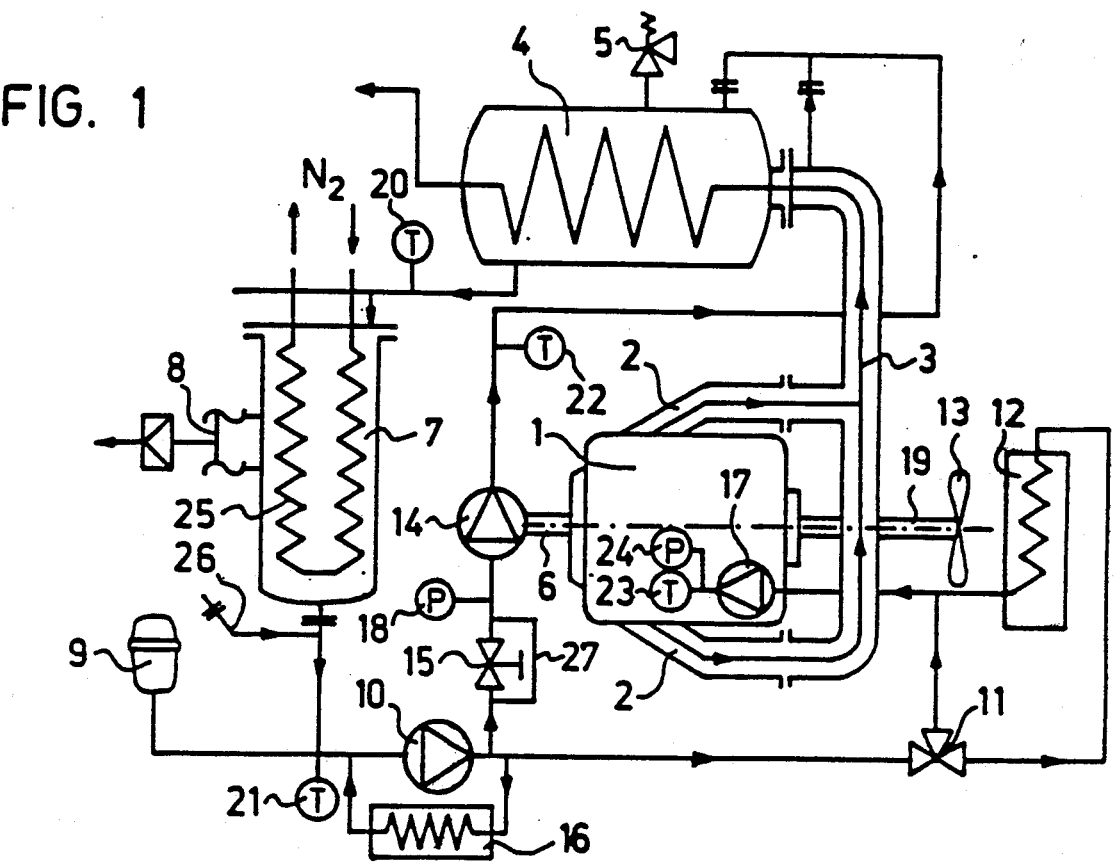

United States Patent [19]

Tornare et al.

[11] Patent Number: 4,881,495
[45] Date of Patent: Nov. 21, 1989

[54] DEVICE FOR VAPORIZING A CRYOGENIC FLUID

[75] Inventors: Jean Tornare, Arisdorf/BF; Klaus Bofinger, Ettingen, both of Switzerland

[73] Assignee: Cryomec AG, Switzerland

[21] Appl. No.: 133,305

[22] Filed: Dec. 16, 1987

[30] Foreign Application Priority Data

Sep. 22, 1987 [EP] European Pat. Off. ............ 87810547

[51] Int. Cl.⁴ .............................................. F01P 1/06
[52] U.S. Cl. .................................. 123/41.31; 122/26; 62/53.2; 123/41.02
[58] Field of Search .................... 123/41.02, 41.31; 122/26; 237/1 R; 62/53

[56] References Cited

U.S. PATENT DOCUMENTS

| | | | |
|---|---|---|---|
| 4,027,631 | 6/1977 | Lavery | 122/26 |
| 4,197,712 | 4/1980 | Zwick et al. | 62/53 |
| 4,264,826 | 4/1981 | Ullmann | 122/26 X |
| 4,290,271 | 9/1981 | Granger | 62/53 |
| 4,293,092 | 10/1981 | Hatz et al. | 122/26 X |
| 4,409,927 | 10/1983 | Loesch et al. | 122/26 |
| 4,420,942 | 12/1983 | Davis et al. | 62/53 |
| 4,438,729 | 3/1984 | Loesch et al. | 122/26 |
| 4,458,633 | 7/1984 | Loesch et al. | 122/26 |

*Primary Examiner*—E. Rollins Cross
*Attorney, Agent, or Firm*—Tilton, Fallon, Lungmus & Chestnut

[57] ABSTRACT

The device operates with an internal combustion engine (1) and utilizes the combustion heat of the same. In addition to the heat of the cooling water exiting from the engine (1), the exhaust gases are transferred to a water circuit in an exhaust gas heat exchanger (4). The mechanical performance of the engine (1) is, through the direct application of a hydraulic brake (14), almost completely changed into thermal energy, and the heat thus produced is likewise conducted to the water circuit. The water heated is conducted through a vaporizing unit (7), where it brings the cryogenic fluid conducted in a pipe coil (25) or in a pipe assembly to vaporization.

9 Claims, 1 Drawing Sheet

DEVICE FOR VAPORIZING A CRYOGENIC FLUID

The present invention concerns a device for conducting heat to a cryogenic fluid, so that it can be brought to vaporization. Systems are known which heat such fluids to a certain temperature, and simultaneously pump as well. An expanded task of such systems is to change nitrogen from fluid to gaseous conditions, in order to make nitrogen gas available for various purposes of use. The vaporized nitrogen is used, for example, to rinse out water entering into oil drilling holes, or to penetrate petroleum and natural gas-bearing rock strata. Further uses are, for example, the rinsing of tanks in tanker ships or cleaning and compression testing pipelines by means of nitrogen gas under high pressure. Also, pipelines of chemical plants are cleaned by means of nitrogen gas, by blowing sand through the pipes by means of the gas. This method is known as "SANJET" in professional circles. Furthermore, nitrogen is also used to fill compressed air cylinders.

Many systems operate with burners, in order to produce the necessary vaporization heat. Burners can not, however, be used in all places. If the vaporizing device must be operated, for example, in places where, because of the presence of certain materials in the environment, there exists an acute danger of fire or even explosions, then obviously a burner, particularly an open burner, can simply not be operated. In such cases, internal combustion engines are used to produce heat. If only small quantities of fluids need to vaporized, then the thermal exhaust of such engines is generally sufficient. The accumulating combustion heat is transferred by means of the water of the engine's own cooling circuit. This cooling water is conducted into a vaporizing unit, through which the cryogenic fluid flows. Inside the vaporizing unit, the heat then flows from the water to the fluid, and thus increases its temperature, so that it vaporizes. The water is consequently corresponding cooled off, and flows back to the internal combustion engine, where it again absorbs heat, and thus fulfills its function as a cooling agent. In addition, the heat present in the exhaust gases can be used as well. In this, the exhaust gases can flow directly through the vaporizing unit, so that the exhaust is conducted through the pipe coil and vaporizing unit. In another execution, the exhaust heat is imparted to the cooling water, which comes from the engine. For this purpose, the cooling water can directly flow through the exhaust pipe. If, however, larger amounts of cryogenic fluids need to be vaporized, then considerable quantities of heat are necessary. It would be uneconomical in this case to use only the exhaust heat of the internal combustion engine, but not its mechanical power, which constitutes a third of its energy balance. The task to be solved therefore consists of transforming the accumulating shaft output of an internal combustion engine into usable thermal energy in as waste-free a manner as possible. In one known system, the shaft power of the internal combustion engine is already used, but not just for vaporization, but primarily for pumping the fluid to be vaporized. The internal combustion engine, with its output shaft, drives a hydraulic pump. The oil conveyed by this further drives a hydraulic engine by means of its pressure, by means of which a fluid pump is driven, which pumps the fluid through the vaporizing unit. At the same time, the heat accumulating in the hydraulic system is utilized, since it is transferred to a water circuit and is radiated from there to the fluid by means of the vaporizing unit. The disadvantage of this system is above all to be seen in the fact that it is very complicated in its construction. It is obvious that this raises the costs of a corresponding apparatus. Furthermore, it is relatively difficult to control this system, since a large number of parameters are present. In addition to the output of the internal combustion engine, that of the hydraulic engine, the hydraulic pump and the fluid pump can be variable. All of these performances must be so adjusted to one another that the usable thermal exhaust of the internal combustion engine is sufficient to vaporize the quantity of cryogenic fluid conveyed through the fluid pump. Furthermore, a special intermediary heat exchanger is necessary in order to transfer the heat stored in the oil to the water. This heat exchanger naturally has a negative effect on the efficiency of the device.

The present invention therefore has as its task that of creating a device for vaporizing a cryogenic fluid which, with the simplest means, attains the highest possible vaporization capacity with the aid of an internal combustion engine, the vaporization capacity of which is as simple as possible, and can be controlled with much less materials expense.

The invention solves this task by means of a device for vaporizing a cryogenic fluid with an internal combustion engine, the thermal exhaust of which is at least partially emitted from the cooling water and the exhaust gas to a vaporizing unit by means of a hydraulic circuit, which is distinguished by the fact that a hydraulic brake in the form of a hydraulic brake retarding unit is present, which can be driven by the output axis of the internal combustion engine, and that this hydraulic brake, together with at least the vaporizing unit, forms a closed cooling circuit for the water to transfer the heat produced in the hydraulic brake.

In the diagram, there is depicted by way of example a scheme of the components of the device in accordance with the invention.

FIG. 1 depicts the device schematically.

In the following, the invention will be illustrated in detail by means of the schematic diagram, and its operation will be thereby explained.

The central component of the invention is the hydraulic brake (14). This hydraulic brake (14) is a so-called hydraulic brake retarding unit, which is available commercially. It essentially consists of a casing, which is as a rule constructed from two symmetrical casing shells. In specially constructed free spaces in the interior of the assembled casing, one or more blade wheels are positioned in a rotatable manner. The blade wheels run on a common axis, which is supported on both sides in the casing. Since the blades of the blade wheels extend relatively closely along the internal casing walls, considerable turbulence arises in the water flowing through the casing. These produce a strong dynamic resistance for the blade wheels rotating in the hydraulic brake. The mechanical shaft output on the blade wheel shafts is, because of this resistance, nearly completely transformed into thermal power, which can be further used. The hydraulic brake (14) is, in accordance with the invention, driven directly by the output shaft (6) of the internal combustion engine (1). The internal combustion engine (1) can be a gasoline, gas, or, most advantageously, a diesel engine. If the engine has to be operated in the area of explosive gases, the choice strongly falls on a diesel engine, since no ignition sparks arise, which could bring the gas surrounding it to an explosion. With the help of the hydraulic brake (14) directly screwed on to the engine block, its mechanical power can, as described, be transferred almost completely, and without intermediary heat exchangers, into usable thermal efficiency. The heat thus produced constitutes approximately one third of the energy balance of the internal combustion engine. It is conducted away by the water, which flows through the hydraulic brake, and flows together with the heat from the cooling water exiting from the engine. This cooling water has previously absorbed, in the interior of the engine block, the largest portion of the combustion heat of the engine. A water-cooled internal combustion engine has such an internal cooling circuit. The water is circulated in this circuit by means of the engine's own hydraulic pump (17). After the heat from the hydraulic brake (14) and that from the cooling water of the motor (1) have been brought together, the water acting as thermal carrier flows further through an exhaust gas heat exchanger (4). In this, the heat of the exhaust gas is transferred as much as possible to the water flowing through it. In this, the heat exchanger (4) can be so constructed that, in its interior, the pipe which conducts the water runs in a coiling manner, or branches into a pipe assembly, and this pipe coil or this pipe assembly is then flowed around by the heat exhaust gases. In the execution depicted here, however, the water flows around the exhaust pipe, which is constructed as a pipe coil or pipe assembly. This circulation takes place before the pipe or pipes with the cooling water or the exhaust gases have even reached the exhaust gas heat exchanger. The exhaust pipes (3) with the hot combustion gases are from the beginning and on displaced into the interior of the tube (2), where the exhaust gases exit from the cylinders, and are brought together with collecting pipes into a single exhaust pipe (3). In the entire heat conduction of the device in accordance with the invention, care must be taken, as soon as several heat sources are connected together, that the heat only flows from places with higher temperatures to places with lower temperatures. This rule is taken into account in the present device. This means that the exhaust gases in the interior of the exhaust gas heat exchanger (4) always have a still higher temperature than the water previously heated by means of the engine cooling and the braking power of the hydraulic brake (14). The exhaust gas heat exchanger (4) is equipped with a safety valve (5). In the event that the water is heated in ranges above its steam pressure curve, and dangerous overpressures form in the interior of the heat exchanger (4), which could even cause the bursting of the container, this pressure-controlled valve (5) opens automatically, and thus removes any excess pressure in the exhaust gas heat exchanger (4) as soon as a set pressure level has been exceeded. The water thereupon leaves the exhaust gas heat exchanger (4), and a thermometer mounted on the corresponding water line continuously monitors the temperature, and therefore, by means of comparing the quantities of water conveyed corresponding to the pump output, the thermal efficiency can be measured. In this vaporizing unit (7), the cryogenic fluid, nitrogen, for example, is conducted through the pipe coil (25) or a pipe assembly. This pipe coil (25) or this pipe assembly is surrounded on all sides by heated water, through which the heat stored in the water flows through the walls of the pipes and to the fluid. This is thereby heated through the fact that it vaporizes and finally leaves the vaporizing unit (7) in a gaseous condition. The vaporizing unit (7) is equipped with an overpressure safety in the form of a safety bolt disk (8). The water correspondingly cooled off by the pipe coil (25) or the pipe assembly finally leaves the vaporizing unit (7), and its temperature can be monitored by means of a further thermometer (21). The temperature differential between both thermometers provides, together with the water quantity conveyed, information about the thermal quantity transmitted in the vaporizing unit (7). In connection with the vaporizing unit (7), a connector (26) is mounted in the water line, by means of which water can be conveyed to the circuit. This is necessary both for the initial putting into operation as well as for compensation for any losses which arise from leakage. Furthermore, an expansion container (9) is connected to the water line. From the thermometer (21), the water is conducted through a pump (10), which maintains the desired flow in the entire circuit, mainly between the hydraulic brake (14), the exhaust gas heat exchanger (4), and the vaporizing unit (7). Such a water pump (10) can likewise be driven by the output shaft (6) of the internal combustion engine (1) or by its own engine. The cool water exiting from it can be used with a part for cooling the oil cooler (16) belonging to the water pump (10), whereupon it can again be led in, before the water pump (10), to the water line. After leaving the water pump (10), the water is under a pressure of at least 4 bar. The water line branches here. One /line/ passes through a valve (15) to the hydraulic brake (14). From there, a manometer (18) is connected to the water line. The necessary pressure for operating the hydraulic brake (14) can be monitored on this. By means of the valve (15), which can be connected before or after the hydraulic brake (14), the thermal performance of the hydraulic brake (14) can be controlled, so that the flow quantity can be varied. At zero flow quantity, the thermal output is also zero. It arises with increasing flow quantity. These typically lie between zero and a few m$^3$ per hour. The valve (15) is permanently bridged over by means of a thin pipeline (27). By this means it is ensured that the hydraulic brake (14) never runs dry. Such an operation would, of course, destroy the slide ring sealings of the brake. After the hydraulic brake (14), a further thermometer (22) serves for the purpose of monitoring the brake and thermal output of the hydraulic brake (14). Thereupon, the water flows on, and is, together with the cooling water, conducted from the engine through the exhaust gas heat exchanger (4), as has already been described above. The other part of the water goes from the branching point behind the hydraulic pump (10) to a three-way valve (11) constructed as a thermostat. Depending on the temperature, it flows from there through the radiator (12), or if it is sufficiently cool, it goes directly into the engine block through the closing of the radiator (12), in which block it again absorbs combustion heat from the motor (1). The radiator (12) is surrounded by the ambient air, which is supported by the ventilating unit (13), which is driven by the opposite output shaft (19) of the engine (1). The approximate flow quantity in the cooling system of the engine (1) reaches about five times the maximum flow quantity of the hydraulic brake (14). All these size proportions are essentially determined by the energy balances in the individual components. A thermometer (23) as well as a manometer (24) are also attached to the cooling circuit of the engine (1) in order to monitor operating conditions. It is, of course, also possible to construct a separate circuit, which connects the hydraulic brake (14) with the vaporizing unit (7) and the pump (10). Furthermore, the water can, for example, also be pumped in parallel through the engine block and/or through the exhaust gas heat exchanger, or one of these two components is connected in series to the hydraulic brake (14). The device in accordance with the invention allows up to 90% of the total combustion heat of the engine to be transformed into usable thermal energy. The control of the thermal efficiency in the entire performance range of the hydraulic brake is carried out in the simplest manner by means of the valve (15), since, during normal operation, the engine is allowed to continue running at a set rotational speed. The device is used to vaporize or simply to heat various fluids. Primarily, however, it serves to vaporize cryogenic fluids, particularly nitrogen. The gases produced can be used for a great number of commercial applications. Gaseous nitrogen is above all used in large quantities in the oil drilling industry for the treatment of oil drilling holes. The invention makes possible a device for the production of this gaseous nitrogen which is simpler and more economical in construction and operation than conventional devices.

What is claimed is:

1. A device for vaporizing a cryogenic fluid with an internal combustion engine (1), the exhaust heat of which can be at least partially transferred to a vaporizing unit (7), from the cooling water and the exhaust gases and through a water circuit, characterized in that a water brake (14) in the form of a water brake restrainer is present, which can be driven by the output shaft (6) of the internal combustion engine (1), and that this water brake (14), together with at least the vaporizing unit (7), forms a closed cooling circuit for the water transferring the heat produced in the water brake.

2. A device in accordance with claim 1, characterized in that the water brake (14), together with the vaporizing unit (7), the coolant circuit of the internal combustion engine (1) and its radiator (12), forms a closed cooling circuit for the water which is to transfer the heat.

3. A device in accordance with claim 1 or 2, characterized in that the water brake (14), together with at least the vaporizing unit (7), the cooling circuit of the internal combustion engine (1), its radiator (12) and an exhaust gas heat exchanger (4), forms a closed circuit for the water which is to transfer the heat.

4. A device as in claim 1, characterized in that a valve (15) is connected in front of or behind the water brake (14), by means of which valve the thermal efficiency of the water brake (14) can be regulated, since the temporal flow rate of water through the water brake (14) is variable.

5. A device as in claim 2 characterized in that the radiator (12) belonging to the cooling circuit of the internal combustion engine (1) is closed by means of a three-way valve (11) acting as a thermostat, with variable flow quantity rates through a parallel line.

6. A device as in claim 2, characterized in that the cooling circuit of the internal combustion engine (1) is connected with its radiator (12) parallel to the water brake (14), and that, in the flow direction of the water connecting with this parallel connection, first of all the gas heat exchanger (4), then the vaporizing unit (7), then an expansion container (9), and finally a water pump (10) are positioned in series, whereupon the circuit branches again into the above-mentioned parallel connection.

7. A device as in claim 1, characterized in that the internal combustion engine (1) is a diesel generating system, and the water brake (14) is directly screwed on to its engine block.

8. A device as in claim 1, characterized in that an oil cooler (16) for the water pump (10) is positioned parallel to the water pump (10) in the circuit, in such a manner that at least one part of the water exiting behind the water pump (10) flows through the oil cooler (16), and enters the circuit again in front of the water pump.

9. The use of the device as in claim 1, for the purpose of vaporizing or of heating a cryogenic fluid.

* * * * *